June 19, 1956 L. W. BURTON 2,751,528

RECTIFIER CELL MOUNTING

Filed Dec. 1, 1954 2 Sheets-Sheet 1

Inventor:
Lester W. Burton
by, Richard E. Hosley
His Attorney

Inventor:
Lester W. Burton
by, Richard E. Hosley
His Attorney

United States Patent Office 2,751,528

Patented June 19, 1956

2,751,528

RECTIFIER CELL MOUNTING

Lester W. Burton, Danvers, Mass., assignor to General Electric Company, a corporation of New York Application December 1, 1954, Serial No. 472,297

7 Claims. (Cl. 317—234)

Figure 1:
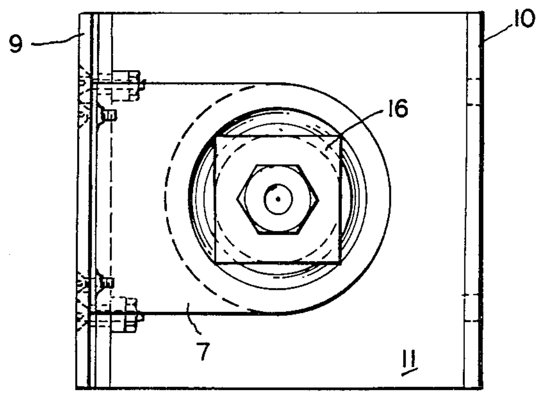

My invention relates to rectifier cell mountings in which provision is made for the reduction of mechanical strains on the cell resulting from changes in the size or dimensions of the cell assembly and its parts with changes in temperature. Cell mountings in accordance with my invention also provide an enclosure for the cell and an effective cooling thereof.

Rectifier cells of the barrier layer type are sensitive to pressure, surrounding media, and heat. This is particularly true of monocrystal semiconductors having a rectifying barrier layer called a P-N junction such as broad area germanium and silicon rectifier cells.

My invention is particularly suited for mounting silicon and germanium rectifier cells of the P-N junction type described and claimed in the application of Robert N. Hall, Serial No. 187,478, filed September 29, 1950, and assigned to the same assignee as the present invention. In accordance with the method of making such cells as disclosed in this application, electron donor and electron acceptor impurity elements are brought into surface contact with different surface portions of a semi-conductor such as germanium and diffused therein to a partial depth short of intermingling within the semiconductor, to form the desired P-N junction. In accordance with one construction, a thin single grain wafer of germanium is provided on one surface with a layer or film of indium and an overlaying disk of fernico and on the opposite surface with a layer or film of an alloy of tin and arsenic and an overlaying disk of fernico. The germanium wafer is about 20 mils thick, the indium and tin-arsenic layers have a combined thickness of about 3 mils, and the combined thicknesses of the fernico disks have a thickness of about 12 mils. A cell of this construction of about 9⁄16 inch in diameter will provide half-wave rectification at 35 volts and 75 amperes with a heat loss of about 60 watts.

Germanium is a hard brittle metal and the thin wafer thereof used as a rectifier cell may be destroyed by mechanical strains imposed thereon through its contact members or electrodes which make a conductive engagement with the contact surfaces of the cell. Furthermore under operating temperatures, pressures exerted on the cell may squeeze out the indium film between one surface of the cell wafer and its covering disk of fernico. This is also true to a lesser degree with regard to the tin-arsenic layer on the other surface of the germanium wafer.

Also due to the negative temperature coefficient of resistance of germanium, undue heating of the cell will lead to its destruction. At normal ambients the forward losses predominate but as the temperature increases the reverse losses take over and may exceed the forward ones. The breakdown voltage of such a cell is an inverse function of its temperature and cell failure occurs when its breakdown voltage becomes less than the applied voltage and the cell short circuits. Since the thermal time constant of the cell, because of its small size, is measured in cycles, the 60 watt loss of a unit such as above described must be dissipated as fast as it is generated. Furthermore such cells having very thin barrier layers and operating at high voltage are adversely affected by the humidity of the atmosphere or the deleterious effects of foreign and corrosive agents in the air or other surrounding medium. To protect against such deleterious agents the cell must be enclosed and preferably hermetically sealed.

It is an object of my invention to provide a mounting for rectifier cells of the barrier layer type in which the cell is enclosed and suitably cooled by an arrangement of parts that prevents the application of destructive pressures to the cell when the parts thereof change in size due to heating.

It is also an object of my invention to provide a mounting in which the rectifier cell is supported on one of its electrodes which also serves as a support for a flexible sheet member which is electrically insulated therefrom and forms part of an enclosure for the cell and through which the other cell electrode extends. The flexibility of this sheet member prevents pressure build up on the cell due to the change in dimensions of the parts as a result of their changes in temperature.

It is also an object of my invention to provide a rectifier terminal block assembly having spaced apart terminal lugs between which are located a rectifier cell mounting in which one cell electrode extends through an electrically conductive flexible diaphragm which is mounted on and insulated from the other cell electrode and which makes a conductive engagement with one of said terminal lugs which is mounted on and electrically insulated from the body portion of the other terminal lug which is electrically connected conductively with said other cell electrode through its body portion on which it is mounted.

Further objects of my invention will become apparent from the following description of the embodiments thereof shown in the accompanying drawings.

Figure 2:
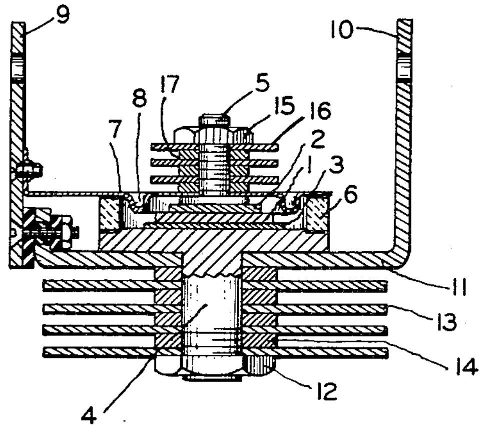
Figure 3:
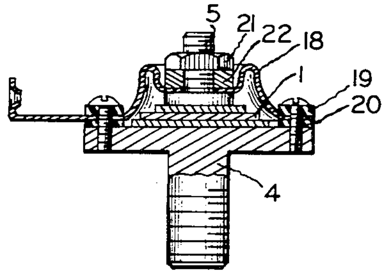
Figure 4:
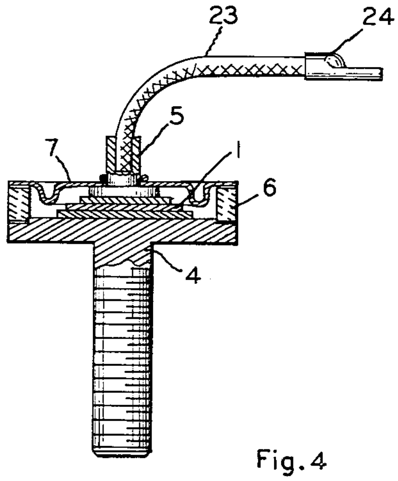
Figure 5:
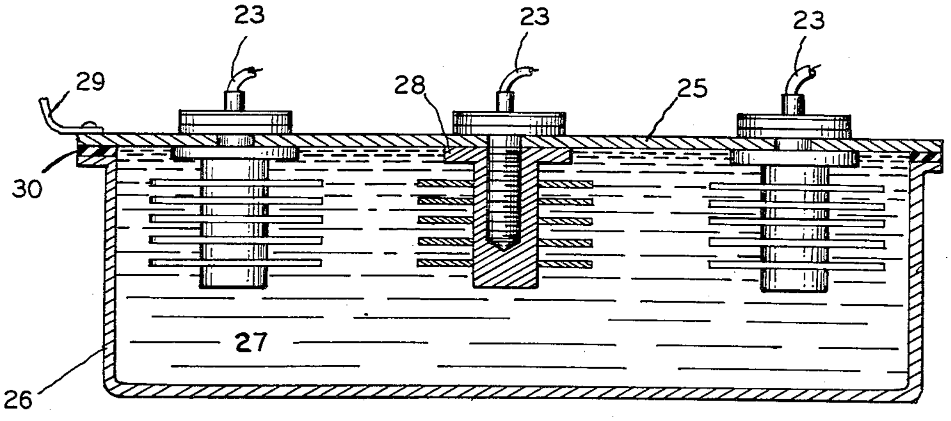

In the drawings Figs. 1 and 2 are respectively plan and side sectional views of one embodiment of my invention, Fig. 3 is a side sectional view of another embodiment thereof, Fig. 4 is a side section view of a third embodiment thereof and Fig. 5 is a side view partly in section of a liquid cooled rectifier assembly embodying a plurality of cell mountings having the structure shown in Fig. 4.

In accordance with the embodiments of my invention shown in the accompanying drawings, the opposite contact surfaces of a unilaterally conductive cell are conductively secured to cooperating electrodes one of which acts as a support for the cell as well as a support for a flexible sheet or diaphragm forming part of the cell enclosure and through the midportion of which the other cell electrode extends. The flexible sheet is electrically insulated from one of the electrodes and may act as a conductive connection to the electrode extending therethrough or this electrode may be provided with its own terminal connection. The cell enclosure is supported by suitably mounting the electrode which carries the cell and acts as a support for the flexible sheet member. One or both electrodes may be provided with cooling fins or their equivalents to dissipate heat conducted from the cell through these electrodes. The cooling fins may be mounted on the projecting body portions of the electrodes or form part of another or similar member mounted on these projecting body portions. To reduce the application of shock forces applied to the rectifier cell by the electrode extending through the flexible diaphragm, the cooling fin arrangement thereon is made small or completely eliminated. The flexible diaphragm permits relative movement of the assembled parts due to their changes in size with changes in temperature. It also provides a convenient sealing arrangement for enclosing the rectifier cell and protecting it from moisture and deleterious agents in the air or from the action of any cooling medium which may be applied thereto. Heat build up in the cell is also prevented by radiation and conduction of heat therefrom through its electrodes which are sufficiently massive to accomplish this purpose.

The rectifier cell mounting shown in Figs. 1 and 2 forms part of a terminal block assembly by means of which unit cells may be connected in circuit with one another or other electrical units to provide desired translating devices. The mounting comprises a unilaterally conductive cell 1 having on opposite sides thereof contact surfaces 2 and 3 each of which makes an electrical conductive engagement with a different one of a pair of cooperating electrodes 4 and 5. Each electrode has a rodlike body portion provided with an enlarged contact head the end surface of which engages a contact surface of the cell. Electrode 4 is a support electrode on which cell 1 is mounted and the other electrode 5 constitutes a counterelectrode. The contact head of support electrode 4 is larger in end surface area than the cell and the counterelectrode head and provides on its cell supporting surface a peripheral area external to the cell and counterelectrode on which an insulating ring 6 is mounted. This ring is located in a flanged recess which acts as a positioning seat for one end of the ring. The other end of the ring is closed by a flexible sheet or diaphragm 7 through the midportion of which the body portion of electrode 5 projects. One or more corrugations 8 may be formed in the diaphragm between the portions thereof which engage the electrode 5 and the other end of ring 6 in order to provide greater flexibility and more freedom of movement of electrode 5 relative to cell 1 and electrode 4. The counter electrode 5 engages the diaphragm 7 at the flanged area of its head adjacent its body portion which projects through the diaphragm.

The end surfaces of the insulating ring 6 are metalized and soldered to the peripheries of diaphragm 7 and electrode 4 engaged thereby. The diaphragm is also soldered to the body portion of electrode 5 and the cell 1 is soldered at each of its contact surfaces to the end surfaces of the heads of electrodes 4 and 5. The cell may have the construction described above as comprising a thin wafer 1 of germanium with overlaying disks 2 and 3 of fernico between which and the cell are the impurity elements imparting P-N characteristics to the semiconductor. The electrodes are preferably formed of copper and the diaphragm of annealed copper. The metal end surfaces of insulating ring 6 may be formed of silver or copper. The solder used may be of any suitable composition but I prefer to use the usual lead-tin solder commonly employed in making such assemblies. The soldered connections thus described provide a hermetically sealed enclosure for the unilaterally conductive cell 1 therein.

In Figs. 1 and 2 the cell mounting above described forms part of a terminal block assembly whose characteristic features have been described and claimed in the application of Edgar A. Harty, Serial No. 343,588, filed March 20, 1953, and assigned to the same assignee as the present invention. It comprises a pair of spaced apart contact lugs 9 and 10 each of which extends substantially the same amount in the same direction from a base 11 integrally formed with lug 10 and consequently electrically connected therewith. The other lug 9 is mechanically attached to a flanged edge on the side of the body portion 11 opposite the contact lug 10. In the arrangement shown this attachment is made by using a plurality of bolts to hold the parts together in conductive engagement with one another. Insulation is provided between the bolts, lug 9, and body portion 11 of lug 10 to insulate electrically one lug from the other. The parts of the terminal block assembly just described are formed of metal and preferably of copper. Lug 9 is offset outwardly from the juxtaposed edge of the base 11 of lug 10 so that these contact lugs may be connected with similar contact lugs of like terminal blocks without producing a short circuit between the contact lugs of any one terminal block.

The rodlike body portion of electrode 4 projects through a mounting hole in the body portion 11 of lug 10 so that its flanged area adjacent its head engages a surface area of the base 11 located between the upstanding terminal lugs 9 and 10 which consequently act as a mechanical shield for the cell enclosing portions of the mounting. The rodlike portion of electrode 4 may be threaded to form the shank of a bolt and the head of electrode 4 may be detachably secured in mechanical and electrical engagement with lug 10 by a nut 12 threaded on electrode 4. To provide cooling of electrode 4 and the cell supported thereon, radiating fins 13 and spacing washers 14 located therebetween may be interposed between nut 12 and the body portion 11 of lug 10.

The rodlike portion of counterelectrode 5 may also be threaded for a nut 15 between which and diaphragm 7 a number of radiating fins 16 spaced by washers 17 may be placed to facilitate dissipation of heat from electrode 5 and cell 1 which it engages. It is to be noted that fins 16 are smaller in size and less in number than those on the rigidly supported electrode 4 in order to reduce the magnitude of shock forces applied through electrode 5 to cell 1 and the bond between the cell and the head portion of electrode 5.

As previously pointed out, electrode 4 is electrically connected to lug 10 through its body portion 11. Lug 9 is connected to electrode 5 through diaphragm 7 one side of which extends beyond ring 6 and is provided with a flanged edge which is screw attached to the inside surface of lug 9 to form a conductive connection therewith. Thus current connections are made with cell 1 through lugs 9 and 10 which are connected through diaphragm 7 and electrodes 4 and 6 to its oppositely disposed contact surfaces.

It will thus be appreciated from the above description that I have provided a rectifier cell mounting having a construction which will reduce the mechanical strains on the cell resulting from changes in the dimensions of the cell assembly and its parts with change in temperature. The cell mounting also provides an enclosure for the cell and an effective cooling thereof.

The cell mounting shown in Fig. 3 is a variation of that shown in Figs. 1 and 2. In Fig. 3 the rectifier cell is provided with a support electrode 4 and a counterelectrode 5 each of which has an enlarged head portion which engages a different one of the opposite contact surfaces of the cell 1. The diaphragm 18 however is of a different configuration from that shown in Figs. 1 and 2 and its mounting is different. Its peripheral edge has been screw attached to the rim of the head portion of support electrode 4 from which it is electrically insulated by washers 19 and 20. The diaphragm 18 is provided with a re-entrant portion at its center through which the electrode 5 projects and against which the head of this electrode is clamped by a nut 21 acting through a washer 22. The diaphragm 18 is provided with a side extension as shown in Figs. 1 and 2 which may be connected with a lug such as is shown in this figure. No radiating fins are applied to the portion of electrode 5 which extends beyond the flexible diaphragm 18 which is provided with one or more folds as illustrated in order to increase its flexibility. The mechanical assembly of the cell enclosure including diaphragm 18 is the principal difference of the construction shown in Fig. 3 from that shown in Figs. 1 and 2. The cell mounting may be supported as in Figs. 1 and 2 by a bolted arrangement such as shown in Figs. 1 and 2.

The physical arrangement of the enclosure for cell 1 shown in Fig. 4 is substantially the same as that shown in Figs. 1 and 2. In this case, however, the counterelectrode 5 is provided with an end socket for the flexible conductor 23 having a terminal 24 so that an electrical connection is provided for the counterelectrode of the cell without having current flow through the diaphragm 7. The diaphragm 7 can consequently be formed of some non-metallic substance or of a metal having a high electrical resistance which becomes no matter of importance in view of the fact that electric current is not transmitted therethrough.

The various forms of cell mountings above described may be utilized in other arrangements than the terminal block assembly shown in Figs. 1 and 2. One such arrangement is shown in Fig. 5 where three rectifiers of the type shown in Fig. 4 are mechanically mounted on a common conducting plate 25 forming the cover of a vessel 26 which contains a cooling fluid 27. Each of the cell mountings are held in place by a nut 28 which is threaded on the rodlike body portion of the counterelectrode 4 and produces a clamping engagement of the flanged area thereof adjacent its head with the surface of the conducting plate 25. Each of the counterelectrodes is provided with a conductor 23 as shown in Fig. 4 and plate 25 is provided with a conductive lead 29. Conductors 23 and lead 29 may be suitably connected in three phase rectifier circuits for half-wave or full wave rectification depending on the number of such units employed. It is to be noted that the cover plate 25 is insulated from tank 26 by an insulating gasket 30. This provides an enclosure through which the cooling fluid 27 may be circulated in order to provide forced cooling of the cell mountings. Heat transfer from the cell mountings to the cooling fluid is facilitated by providing a finned structure on the body of each of the clamping nuts 28 by which these cell mountings are held in position on the conducting plate 25.

It is obvious that a rectifier cell mounting embodying my invention need not of necessity provide a hermetically sealed enclosure for the cell since a substantially air tight enclosure such as shown in Fig. 3 may frequently provide the necessary shielding of the cell from deleterious agents in the surrounding medium in which the cell is required to operate. It is also obvious that the assembly of parts to provide a hermetic sealing of the cell may be accomplished through the use of bonding agents other than solder or its equivalent. Thus various types of bonding cement may be employed as an adhesive for securing a hermetically sealed enclosure for the rectifier cell.

Obviously my invention is not limited to rectifier cells having P-N junctions of the type above described since other rectifier cells embodying other barrier layers may be employed. For example selenium or copper oxide cells may be substituted for the germanium cell particularly referred to above.

Thus while I have described certain preferred embodiments of my invention by way of illustrating my invention, the above and other modifications will readily occur to those skilled in the art and I therefore intend in the appended claims to cover all such modifications which fall within the true spirit and scope of my invention.

What I claim as new and desire to secure by Letters Patent of the United States is:

1. A rectifier cell mounting comprising a unilaterally conductive cell having oppositely disposed contact surfaces, a pair of contact members one of which is conductively secured to one of the contact surfaces of said cell and the other of which is conductively secured to the other of said contact surfaces of said cell and has a rim portion extending beyond said cell and said one of said contact members, and a flexible sheet of material having a midportion through which said one of said contacts project and having a peripheral portion mounted on and electrically insulated from the rim portion of said other of said contact members, said assembly constituting a sealed enclosure for said cell.

2. A rectifier cell mounting comprising a unilaterally conductive cell having contact surfaces on opposite sides thereof, a support electrode and a counterelectrode each of which has a rodlike body portion provided with an enlarged contact head the end of which makes a conductive engagement with a different one of the contact surfaces of said cell, the contact head of said support electrode being larger in end surface area than said cell and said counterelectrode head to provide on its cell supporting surface a peripheral area external to said cell and said counterelectrode head, an electrically insulating ring enclosing said cell and said counterelectrode head and having one end thereof mounted on said peripheral area of said support electrode, and a flexible diaphragm enclosing the other end of said ring and engaging said counterelectrode at its flanged area adjacent its body portion which projects through said diaphragm.

3. A rectifier cell mounting comprising a unilaterally conductive cell having contact surfaces on opposite sides thereof, a support electrode and a counterelectrode each of which has a rodlike body portion provided with an enlarged contact head the end of which makes a conductive engagement with a different one of the contact surfaces of said cell, the contact head of said support electrode being larger in end surface area than said cell and said counterelectrode head to provide on its cell supporting surface a peripheral area external to said cell and said counterelectrode head and said contact head of said support electrode also having a flanged area adjacent its body portion which is threaded for the reception of a nut so that the head of said support electrode may be mounted on an electrically conductive member which is clamped between said flanged area of said support electrode and said nut, an electrically insulating ring enclosing said cell and said counterelectrode head and having one end thereof mounted on said peripheral area of said support electrode, a flexible diaphragm enclosing the other end of said ring and engaging said counterelectrode at the flanged area of its head adjacent its body portion which projects through said diaphragm, and a terminal conductor connected to said counterelectrode on the end portion thereof which projects from said diaphragm.

4. A rectifier cell mounting comprising a unilaterally conductive monocrystal cell having a P-N junction between contact surfaces on opposite sides thereof, a support electrode and a counterelectrode each of which has a rodlike body portion provided with an enlarged contact head the end of which makes a conductive engagement with a different one of the contact surfaces of said cell, the contact head of said support electrode having an end surface area which is larger than said cell and said counterelectrode head to provide a peripheral area external to said cell and said counterelectrode head, an electrically insulating ring enclosing said cell and said counterelectrode head and having one end thereof mounted on and sealed to said peripheral area of said support electrode, and a flexible diaphragm enclosing and sealed to the other end of said ring and making a sealed engagement with said counterelectrode at the flanged area of its head adjacent its body portion which projects through said diaphragm.

5. A rectifier cell mounting comprising a pair of spaced apart contact lugs each of which extends substantially the same amount in the same direction from a base integrally formed with one of said lugs and on which the other of said lugs is mounted and electrically insulated therefrom, said other of said contact lugs being offset outwardly from the juxtaposed edge of said base whereby said contact lugs may be connected with similar contact lugs of other cell mountings without producing a short circuit between the contact lugs of any one cell mounting, a unilaterally conductive cell having contact surfaces on opposite sides thereof, a support electrode and a counterelectrode each of which has a rodlike body portion provided with an enlarged contact head the end of which makes a conductive engagement with a different one of the contact surfaces of said cell, the contact head of said support electrode being larger in end surface area than said cell and said counterelectrode head to provide on its cell supporting surface a peripheral area external to said cell and said contact head and said contact head of said support electrode also having a flanged area adjacent its body portion which is in mechanical and electrical conductive engagement with the lug side of said lug base through which its body portion extends and projects from the other side thereof, an electrically insulating ring enclosing said cell and said counterelectrode head and having one end thereof mounted on said peripheral area of said support electrode, an electrically conductive flexible diaphragm closing the other end of said ring and having a central area engaging said counterelectrode at the flanged area of its head adjacent its body portion which projects through said diaphragm and is shielded by said contact lugs to said other of which it is electrically connected through said diaphragm, and cooling fins mounted on the projecting body portions of each of said electrodes.

6. A rectifier cell mounting comprising a pair of spaced apart contact lugs each of which extends substantially the same amount in the same direction from a base integrally formed with one of said lugs and on which the other of said lugs is mounted and electrically insulated therefrom, said other of said contact lugs being offset outwardly from the juxtaposed edge of said base whereby said contact lugs may be connected with similar contact lugs of other cell mountings without producing a short circuit between the contact lugs of any one cell mounting, a semiconductor monocrystal cell wafer having a P-N junction between contact surfaces on opposite sides thereof, a support electrode and a counterelectrode each of which has a rodlike body portion provided with an enlarged contact head the end of which makes a conductive engagement with a different one of the contact surfaces of said cell wafer, the contact head of said support electrode being larger in end surface area than said cell and said counterelectrode head to provide on its cell supporting surface a peripheral area external thereto and said contact head and said contact head of said support electrode also having a flanged area adjacent its body portion which is in mechanical and electrical conductive engagement with the lug side of said lug base through which its body portion extends and projects from the other side thereof, a ring of electrical insulation enclosing said cell wafer and said counterelectrode head and having one end thereof mounted on and sealed to said peripheral area of said support electrode, an electrically conductive flexible diaphragm mounted on and sealing the other end of said ring and having a central area making a sealing engagement with said counterelectrode at the flanged area of its head adjacent its body portion which projects through said diaphragm and is shielded by said contact lugs to said other of which it is electrically connected through said diaphragm and cooling fins mounted on the projecting body portions of each of said electrodes.

7. A rectifier cell mounting comprising a pair of spaced apart contact lugs each of which extends substantially the same amount in the same direction from a base integrally formed with one of said lugs and on which the other of said lugs is mounted and electrically insulated therefrom, said other of said contact lugs being offset outwardly from the juxtaposed edge of said base whereby said contact lugs may be connected with similar contact lugs of other cell mountings without producing a short circuit between the contact lugs of any one cell mounting, a unilaterally conductive monocrystal cell having a P-N junction between contact surfaces on opposite sides thereof, a support electrode and a counterelectrode each of which has a rodlike body portion provided with an enlarged contact head the end of which makes a conductive bonded engagement with a different one of the contact surfaces of said cell, the contact head of said support electrode being larger in end surface area than said cell and said counterelectrode head to provide a peripheral area external thereto and said contact head and said contact head of said support electrode also having a flanged area adjacent its body portion which is in mechanical and electrical conductive engagement with the lug side of said lug base through which its body portion extends and projects from the side thereof, an insulating ring enclosing said cell and said counterelectrode head and having one end thereof mounted on said peripheral area of said support electrode, an electrically conductive flexible diaphragm closing the other end of said ring and having a central area engaging said counterelectrode at the flanged area of its head adjacent its body portion which projects through said diaphragm and is shielded by said contact lugs to said other of which it is electrically connected through said diaphragm, and cooling fins mounted on the projecting body portions of each of said electrodes, the mass of said counterelectrode and its said cooling fins being less than the mass of said support electrode and its said cooling fins in order to reduce the shock forces applied to the bond between said counterelectrode head and the contact surface of said cell which it engages.

References Cited in the file of this patent

UNITED STATES PATENTS

| | | |
|---|---|---|
| 2,215,667 | Sherman | Sept. 24, 1940 |
| 2,261,618 | Esseling et al. | Nov. 4, 1941 |
| 2,383,735 | Ray | Aug. 28, 1945 |
| 2,545,863 | Sell et al. | Mar. 20, 1951 |